Aug 5, 1941.    K. MILLER ET AL    2,251,366
CLUTCH
Filed March 7, 1938    3 Sheets-Sheet 1
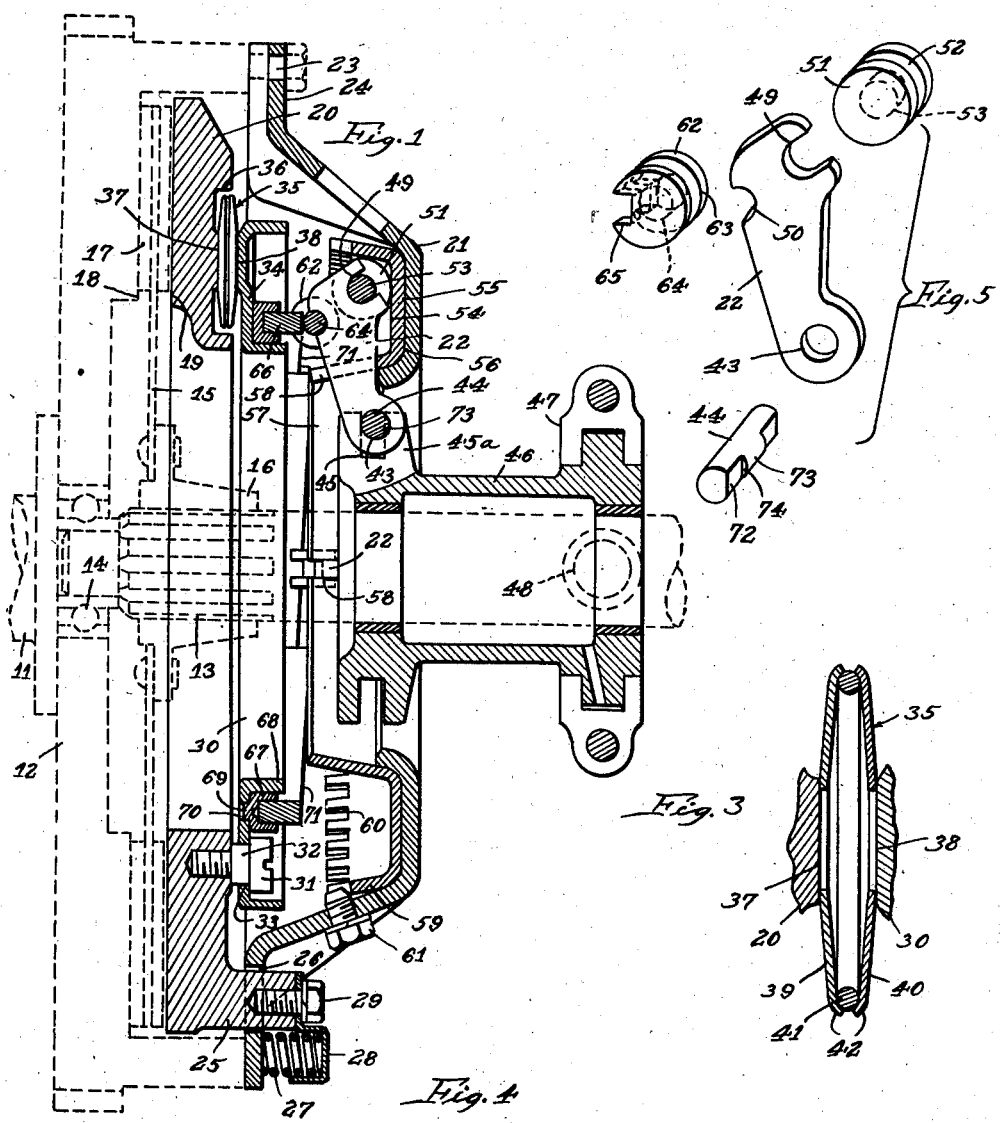
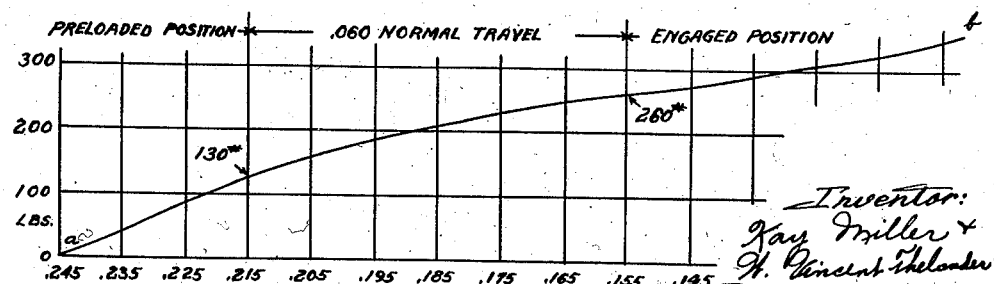

Aug 5, 1941.   K. MILLER ET AL   2,251,366
CLUTCH
Filed March 7, 1938   3 Sheets-Sheet 2
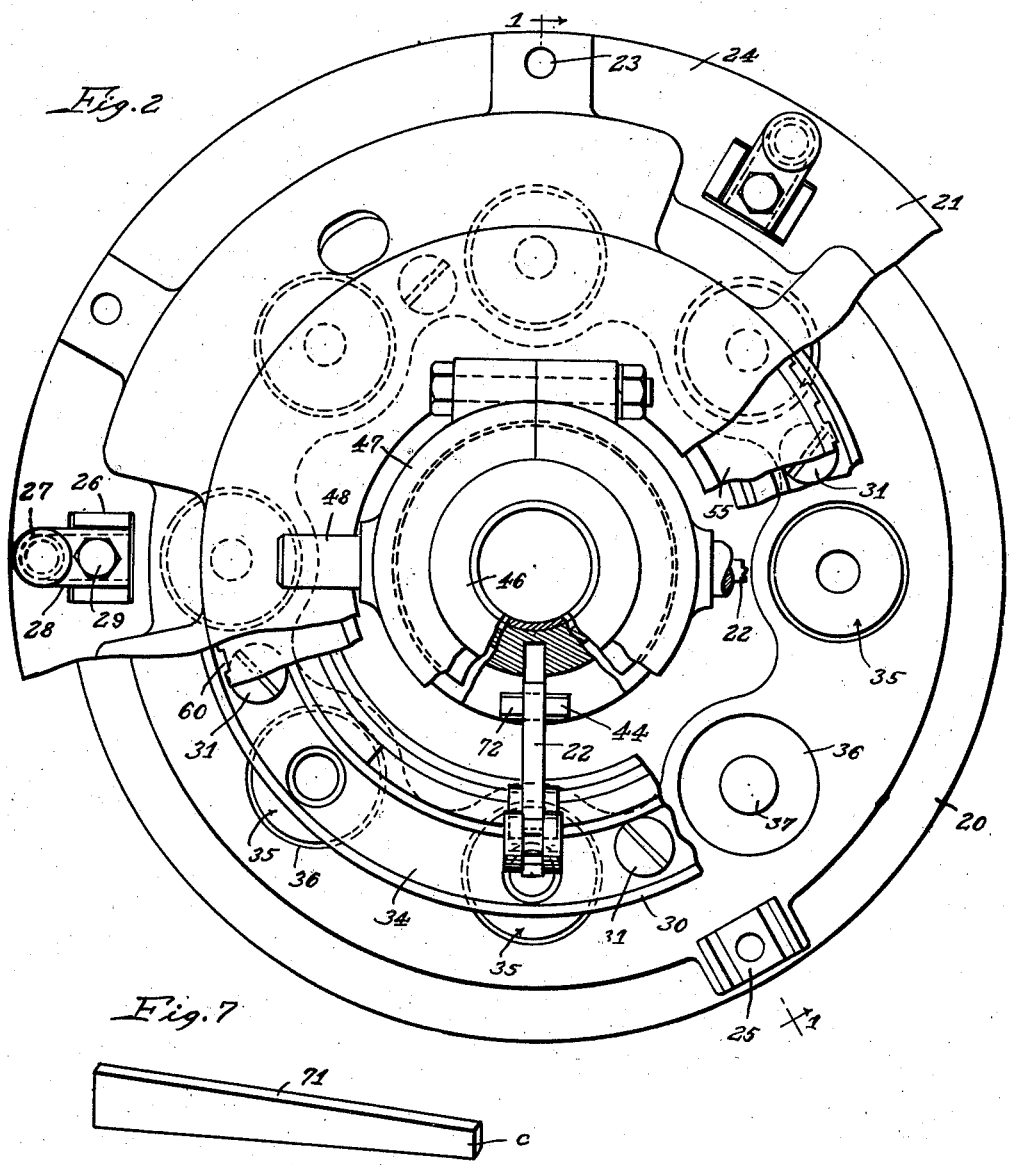
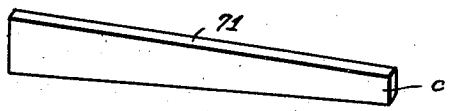
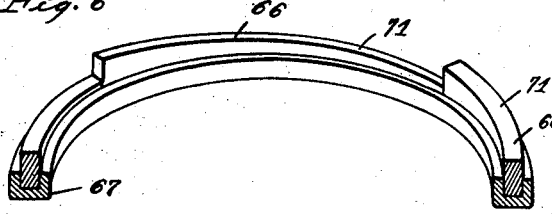

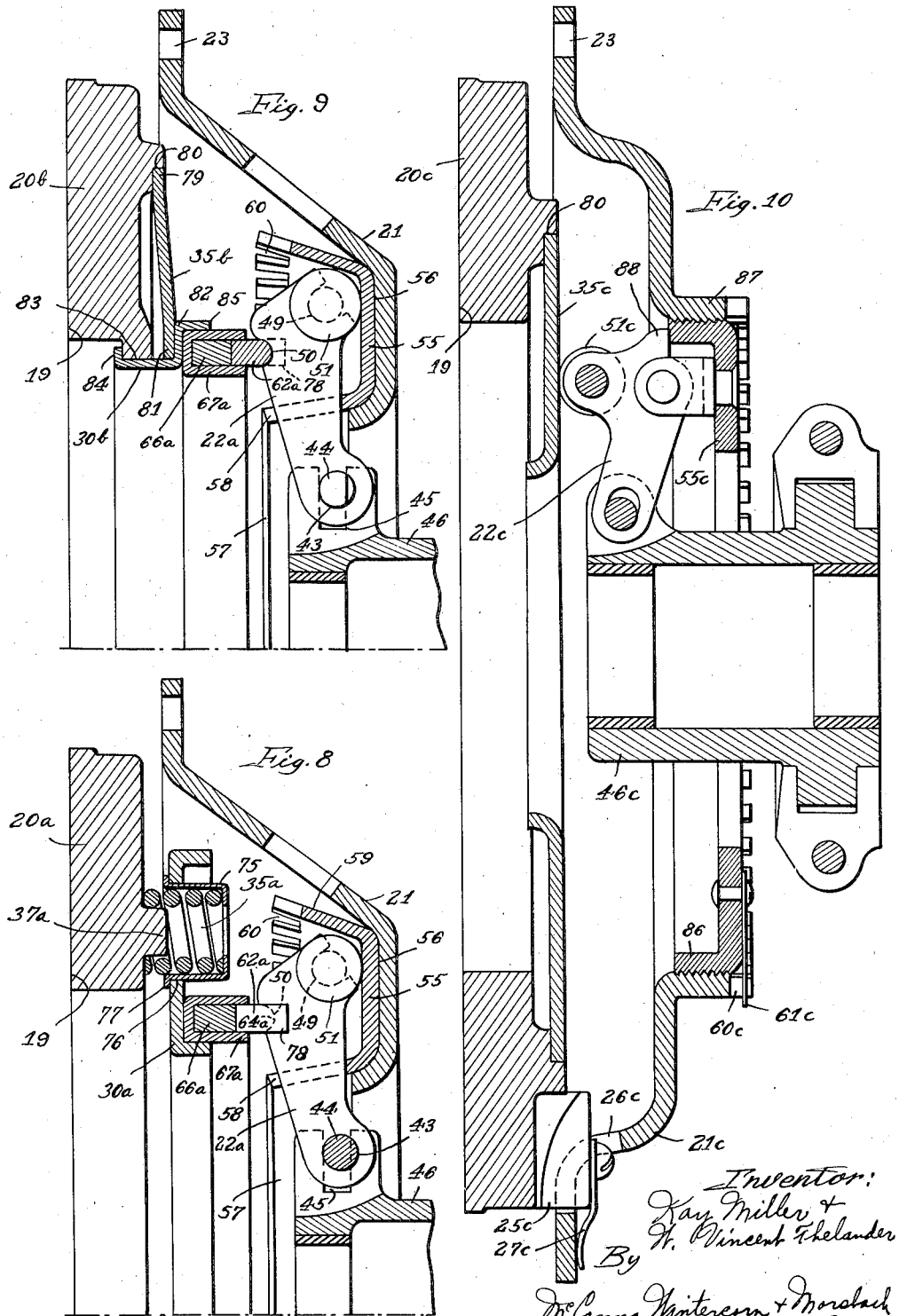

Patented Aug. 5, 1941

2,251,366

UNITED STATES PATENT OFFICE 2,251,366

CLUTCH

Kay Miller and W. Vincent Thelander, Rockford, Ill., assignors to The Atwood Vacuum Machine Company, Rockford, Ill., a partnership composed of Seth B. Atwood and James T. Atwood Application March 7, 1938, Serial No. 194,337

26 Claims. (Cl. 192—68)

This invention relates to friction clutches generally, but is particularly concerned with an improved over-center type of clutch especially designed for tractors and suitable, of course, for other heavy duty purposes.

Over-center clutches have heretofore been of such design that even a small amount of wear on the clutch disk facings caused an appreciable reduction in the engaging pressure and resulted in excessive slippage, thereby accelerating the wear upon the facings. This condition necessitated frequent accurate adjustments which only a specially skilled mechanic could make. It is therefore one of the principal objects of our invention to provide an over-center type clutch of novel design and construction obtaining substantially constant engaging pressure regardless of wear, and designed to operate satisfactorily with fairly coarse adjustment.

A salient feature of the present clutch is the provision of spring means of one form or another between the pressure plate and the over-center engaging means for the purpose of compensating in the spring means for wear of the clutch disk facings. The spring means in one design is a single large Belleville washer, but a more economical construction is obtained using a plurality of circumferentially spaced springs, and in one of those designs we employ at each point two yieldable Belleville washers or disks in stacked relation with a spacer ring therebetween so as to obtain the required travel. The spring means in each case is preloaded, in accordance with our invention, so that despite the small amount of travel obtainable with the over-center engaging means, we obtain the desired engaging pressure, the preloaded spring means being caged for movement with the pressure plate toward engagement with the clutch disk and serving to transmit pressure to the pressure plate upon engagement of the clutch when the over-center engaging means applies pressure to the spring means. In line with this salient feature of the invention, we prefer also to employ a stamped sheet metal back-plate, the give in which will also compensate for wear and tend toward more uniform engaging pressure.

Another important object of the invention is the provision of an improved cam means in connection with the over-center engaging means, which, upon relative rotary adjustment, permits accurate adjustment of the clutch in a fraction of the time usually required for such an operation. The cam means and adjusting means is incidentally of a novel and advantageous design permitting the use of sheet metal stampings almost entirely and quantity production at low cost.

Still another object is to provide a clutch of the over-center type, the engaging means of which incorporates rollers in a novel and advantageous manner so as to reduce friction to a minimum and make for smooth and easy operation.

Other objects and advantages of our invention will appear in the course of the following detailed description in which reference is made to the accompanying drawings, wherein—

Figure 1 is a longitudinal section through a clutch made in accordance with our invention, taken on the broken line 1—1 of Fig. 2, the same being shown disengaged;

Fig. 2 is a rear view of Fig. 1, with certain portions broken away for purposes of better illustration;

Fig. 3 is an enlarged fragmentary sectional detail illustrating one of the spring washer assemblies used in the clutch of Figs. 1 and 2;

Fig. 4 is a graph indicating the spring loading in relation to deflection;

Fig. 5 is a perspective view of a disassembled group of parts which, when assembled, form one of the four over-center clutch engaging levers employed;

Fig. 6 is a perspective view of one-half of the take-up adjustment cam;

Fig. 7 is a perspective view of one of the sheet metal stampings used in making the cam of Fig. 6;

Figs. 8, 9, and 10 are sectional views generally along the lines of Fig. 1, showing modified or alternative constructions.

Similar reference numerals are applied to corresponding parts throughout the views.

Referring first to Figs. 1 to 7, the end portion of the crank-shaft of the engine is indicated in dotted lines at 11 and the flywheel at 12. 13 is the driven shaft extending rearwardly from the flywheel and clutch into the gear box of the transmission, in the usual way. It has the usual pilot bearing 14 supporting the front end thereof at the center of the flywheel 12. 15 is the clutch disk the center hub 16 of which is splined on the front end of the shaft 13 to transmit drive from the flywheel to the shaft when the clutch is engaged. The usual pads or facings 17 on the clutch disk are adapted for engagement with the driving face 18 on the back of the flywheel and the companion driving face 19 on the front of the pressure plate 20. The latter is suitably cast like the flywheel, and the faces 18 and 19 are accurately machined on these cast parts to insure smooth clutch engagement. The back-plate 21, in accordance with our invention, is stamped from sheet metal to the dished form shown, so as to provide enough space between it and the pressure plate 20 for the bell-crank levers 22 which constitute the over-center engaging means of the clutch. The back plate is suitably secured to the rim of the flywheel by bolts entered through holes 23 in the flanged marginal portion 24 of the back-plate. A plurality of equally circumferentially spaced lugs 25 cast integral with the pressure plate 20 project rearwardly therefrom, and these lugs have the side faces thereof machined smooth to slide freely on the sides of the holes 26 provided in the back-plate. In that way, the pressure plate turns with the flywheel, but is movable toward and away from the driving face 18 for engagement and disengagement of the clutch. Springs 27 are held compressed under sheet metal clips 28 fastened onto the ends of the lugs 25 by screws 29 and serve to urge the pressure plate toward the back-plate, whereby to insure immediate disengagement of the clutch when the bell-crank levers 22 are moved to the position shown in Fig. 1, for disengagement of the clutch.

The pressure plate 20 carries a sheet metal ring 30 of generally channel-shaped cross-section on the back thereof on screws 31 which have smooth cylindrical shanks 32 fitting freely in holes 33 provided in equally circumferentially spaced relation in the web portion 34 of the ring. A plurality of stacked spring washer assemblies, indicated generally by the numeral 35, are held compressed between the pressure plate 20 and ring 30, so as to provide what we term a preloaded spring means for resiliently engaging the clutch, the term "preloaded" signifying that upon engagement of the clutch said spring means is subjected to further compression, and it is this increased spring pressure that is effective on the pressure plate holding the clutch disk 15 engaged between the flywheel and pressure plate. The stacked spring washer assemblies 35, of which there are eight shown in Fig. 2, are arranged all on the same radius and in equally circumferentially spaced relation. The pressure plate has circular depressions 36 cored in the back face thereof to receive the same with ample working clearance left around the peripheries of the washers. Flat raised seats 37 are provided on the pressure plate in the centers of these depressions 36 for the spring washer assemblies 35, and the ring 30 has portions of the web 34 thereof struck outwardly to provide raised seats 38 in register with the seats 37 for engagement with the opposite side of the spring washer assemblies 35 at the centers thereof. Each assembly 35, as clearly appears in Fig. 3, consists of two Belleville type spring washers 39 and 40 with a spacer ring 41 therebetween, held in centered relationship with the washers within the curled or flanged peripheries 42 thereof. As indicated by the graph in Fig. 4, each of the eight spring washer assemblies 35 provides an initial or "preload" spring pressure of 130 lbs. per assembly, and in the engagement of the clutch the spring washers are compressed further to exert at least 260 lbs. pressure. Obviously, therefore, since it requires .060" travel to change the compression from the preload pressure of 130 lbs. to the engagement pressure of 260 lbs., it follows that a few thousandths of an inch wear on the clutch disk facings 17 will not be noticeable and cannot seriously affect the operation of the clutch. The spring means 35 requires only .030" compression to reach the preload pressure of 130 lbs., as indicated in Fig. 4, as compared with .060" compression in the operating range to increase the spring pressure another 130 lbs. The spring means 35 may therefore be described as having a low rate within its operating range—lower than is obtainable with coiled springs, for example. As will presently appear, the present clutch embodies a take-up adjustment to compensate for wear, and the objective in making an adjustment will be to advance the pressure plate assembly in relation to the engaging means an amount approximately equivalent to the amount of wear on the facings, whereby, if the engaging pressure has dropped to say 190 lbs., due to approximately .040" wear on the facings (according to the graph), one may obtain again at least 260 lbs. spring pressure for engagement. The adjustment, as will also appear later, does not have to be nearly as close as in the ordinary springless type of over-center clutch, because a deviation of a few thousandths of an inch adjustment one way or the other from the desired point will not seriously affect the operation of the present clutch. The curve a—b (Fig. 4) shows how the deflection of one of the Belleville washer assemblies 35 varies with the load, within the limits of operation of the present clutch.

The bell-crank levers 22 are stamped from sheet metal, as appears in Fig. 5. Each of these levers has a bearing hole 43 in one end thereof to receive a pin 44 adapted to work in the slots 45 in the forked portion 45a on the throw-out collar 46. The latter is operable back and forth by a two-piece ring 47 fitting over a flange on the collar and provided with trunnions 48 for cooperation with the usual yoke or other clutch operating means. The other end of each lever 22 has a fork 49 formed on one edge thereof and a notch 50 on the opposite edge, the notch 50 being at a point closer to the bearing hole 43 than the fork 49. A roller 51 annularly grooved, as at 52, to receive the forked portion of the lever 22 and at the same time provide an axle 53 to bear in the fork 49, rolls on a flat face 54 provided on a sheet metal ring 55 of channel-shaped cross-section slidable in an annular seat 56 provided therefor in the dished portion of the back-plate 21. The ring 55 has its inner flange 57 slotted, as at 58, at four points in equally circumferentially spaced relation to receive and guide four levers 22. The outer flange 59 has the edge thereof notched, as at 60, to receive the end of a set-screw 61 threaded in the backplate 21, in any one of these notches when the ring 55 is turned in the take-up adjustment. The notches are so closely spaced that a rather fine adjustment is permitted. A fulcrum block 62 which is the same as one of the rollers 51 in so far as it is annularly grooved, as at 63, to receive the edge of a lever 22 therein and also to provide an axle 64 to fit in the notch 50, is slotted lengthwise on one side, as at 65, to straddle the peripheral portion of an arcuate cam 66 carried in a sheet metal ring 67 of channel-shaped cross-section carried on the ring 30 on the pressure plate 20. The ring 67 is pressed into place over the inner flange 68 of the ring 30 and it has a small cylindrical boss 69 struck therefrom at one point to enter a hole 70 in the web 34 of the ring 30, so as to eliminate any likelihood of the ring 67 turning with respect to the pressure plate and changing the clutch take-up adjustment. There are four arcuate cams 66, one for each of the levers 22, and these cams are formed from straight strips c (Fig. 7) stamped from sheet metal and subsequently formed to the desired arcuate form. The inclined surface 71 on the blank c provides the desired helical cam surface, which, when the fulcrum blocks 62 are slid along the cams 66 by rotary adjustment of the ring 55, serve to change the relationship between the levers 22 and the spring means 35 and pressure plate 20 to compensate for wear on the clutch disk facings 17. The cams 66 are adapted to be entered with a press fit in the channel of the ring 67. In passing, it will be noticed in Fig. 5 that the pin 44 is machined flat on one side at both ends in the same plane, as indicated at 72, whereby to fit slidably and non-rotatably in the slots 45 while still providing the intermediate cylindrical bearing portion 73 to fit in the bearing hole 43 on the lever 22, but present shoulders 74 for engagement with the sides of the forked portion 45a and thus keep the pin from drifting endwise from its assembled position. In that way, extra retaining means is made unnecessary.

It should be clear from the foregoing description that we have provided an unusually practical and efficient design of over-center clutch and one which may be manufactured at low cost and is adapted to be adjusted by relatively unskilled workmen without difficulty. The fact that stamped sheet metal parts are used to such a large extent, even to the point of building up the take-up cam from stamped sheet metal parts, as herein disclosed, obviously makes for savings in cost of production because expensive machining operations are reduced to a minimum. Another example of where an appreciable saving in cost is realized and a better construction is obtained at the same time is in the take-up adjustment where the stamped sheet metal ring 55 can be turned easily when the set-screw 61 is backed away sufficiently. The small set-screw and the tapped hole required therefor can be provided at a small fraction of the cost of providing accurately threaded large parts and the present slidably adjustable construction is better than what a threaded construction would be, because the slidable parts are better adapted than threaded parts to stand the constant strain imposed thereon when the clutch is engaged.

Referring to Fig. 8, the clutch illustrated is quite similar to that shown in Figs. 1 to 7. Coiled springs 35a are substituted for the stacked spring washer assemblies 35, and are located with respect to the back of the pressure plate 20a by cylindrical bosses 37a fitting in the front ends thereof, as shown. Stamped sheet metal cups 75 fit in holes 76 in the ring 30a and are supported against displacement from the holes by annular outwardly projecting flanges 77. The springs 35a, of which there may be eight to correspond to the eight spring washer assemblies 35, and similarly spaced circumferentially with respect to the pressure plate, are preloaded and held under such compression by the ring 30a which, of course, will have screws 31 similar to those provided in the clutch previously described, holding the ring 30a in a predetermined spaced relation to the pressure plate 20a but with freedom to move toward the pressure plate to increase the compression of the springs. Obviously, coiled compression springs may be provided at a smaller cost than Belleville washers, and even though they will not have the highly desirable characteristics of the Belleville washers, indicated by the graph in Fig. 4, it is obvious that a clutch built along these lines would still be a radical improvement over a springless type of over-center clutch, of which Patents 1,921,315 and 1,923,438 are fair examples. In passing, it will also be observed that the levers 22a of this clutch, while otherwise the same as the levers 22 previously described, cooperate with fulcrum blocks 62a slidable in the channel of a ring 67a along the periphery of the cams 66a set in the bottom of the channel. The blocks 62a are forked, as at 78, to receive the levers and also provide fulcrums 64a to fit in the notches 50 on the levers. This sort of construction is quite similar to the one previously described, but that first described is preferred.

The clutch shown in Fig. 9 resembles the other two clutches described, but in this case a single large Belleville spring washer 35b is provided supported at its outer periphery 79 in an annular seat 80 provided therefor on the back of the pressure plate 20b, and having the movable inner periphery 81 held normally in a certain spaced relation to the back of the pressure plate behind the rim 82 of a sheet metal ring 30b fitting slidably within the inner rim 83 of the pressure plate. An outturned flange 84 on the front edge of the ring 30b engages the rim 83 and keeps the Belleville washer 35b under compression to the preload value of said 1200 lbs. While a single Belleville washer like the one shown at 35b has various advantages, as, for example, the simplicity of construction which it makes possible, and such a spring washer will obtain substantially the same characteristics as the plurality of spring washer assemblies 35, a clutch of this design is not considered by us at present to be as practical as either of the other two designs described, because of the at present much higher cost of one of these washers 35b as compared with the cost of eight springs 35a or eight spring washer assemblies 35. The engaging means employed in this clutch design is the same as that disclosed in Fig. 8, the channel section ring 67a in this case being pressed into place within the flange 85 on the rim 82 of the ring 30b. The operation of this clutch will obviously more closely resemble the operation of the clutch of Figs. 1 to 7 than the clutch of Fig. 8, because of the fact that the Belleville spring washer 35b has substantially the same characteristics as the plurality of spring washer assemblies 35. It goes without saying that the washer 35b is preloaded to approximately 1200 lbs., and that when the clutch is engaged the ring 30b moves with the washer as the engaging means subjects the washer 35b to further compression.

Fig. 10 shows a clutch somewhat similar to that of Fig. 9 in which a sheet metal plate 35c mounted on the pressure plate 20c in an annular seat 80 on the back thereof has rollers 51c engaging the flat back face thereof to cause the pressure plate to move toward engaged position when the bell-crank levers 22c are swung to the position shown. Leaf springs 27c mounted on lugs 25c on the pressure plate engage the back of the marginal portion of the back-plate 21c to urge the pressure plate normally to retracted position relative to the clutch disk, there being slots 26c in the back-plate against the sides of which the machined side faces of the lugs 25c engage slidably to provide a slidable driving connection between the pressure plate and back plate, similarly as in the other designs. A sheet metal ring 55c carries the levers 22c thereon and has an externally threaded forwardly extending flange 86 threaded in an internally threaded flange 87 extending rearwardly from the back plate 21c. A spring 61c on the ring 55c is detachably engageable in notches 60c provided in the edge of the flange 87, whereby to lock the ring 55c in adjusted position, and, of course, this ring will be threaded forwardly in taking up for wear on the clutch disk facings. The ring 35c being of stamped sheet metal will have a certain amount of resiliency and the desired amount of spring pressure can be built up therein in the limited travel afforded by the bell-crank levers 22c to provide for good clutch engagement. Some of the give will also be provided in this design in the back plate itself, the latter being also of stamped sheet metal construction. In passing, attention is called to the lug 88 provided on each of the levers 22c adapted to engage the edge of the flange 86 to limit engaging movement of the pressure plate 20c under action of levers 22c. The operation of a clutch of this design is quite similar to the operation of a clutch like that shown in Fig. 9, due to the fact that the sheet metal ring 35c most closely resembles the Belleville spring washer 35b, although, of course, the present design does not provide for a preloaded condition.

It is believed the foregoing description conveys a good understanding of the objects and advantages of our invention. The appended claims have been drawn to cover all legitimate modifications and adaptations.

We claim:

1. In a friction clutch, the combination with a flywheel constituting the driving element, and a clutch disc constituting the driven element and having facings thereon, of a back plate in fixed axially spaced relation to the flywheel, a pressure plate turning with the back plate and movable toward and away from the same in the disengagement and engagement of the clutch, respectively, positive-acting over-center means for moving the pressure plate away from the back plate to engage the clutch, and yieldable resilient means of a type having an inherent low rate within its operating range arranged to be compressed between the pressure plate and over-center means in the engagement of the clutch to grip the clutch disk resiliently between the pressure plate and flywheel with the full pressure of said resilient means, said resilient means when so compressed being also arranged to maintain clutch engagement by resisting return movement of the over-center means in the direction of disengagement.

2. In a friction clutch, the combination with a flywheel constituting the driving element, and a clutch disc constituting the driven element and having facings thereon, of a back plate in fixed axially spaced relation to the flywheel, a pressure plate turning with the back plate and movable toward and away from the same in the disengagement and engagement of the clutch, respectively, positive-acting over-center means for moving the pressure plate away from the back plate to engage the clutch, spring means of a type having an inherent low rate within its operating range arranged to be compressed in the operation of the over-center means between the pressure plate and over-center means for resiliently transmitting pressure from the latter to the pressure plate and maintaining the clutch in engaged position by resisting return movement of the over-center means, and means having lost-motion connection with the pressure plate holding the spring means in pre-loaded condition but permitting further loading by said over-center means when the latter is operated to engage the clutch and moves said holding means within its lost-motion connection.

3. In a friction clutch, the combination with a flywheel constituting the driving element, and a clutch disc constituting the driven element and having facings thereon, of a back plate in fixed axially spaced relation to the flywheel, a pressure plate turning with the back plate and movable toward and away from the same in the disengagement and engagement of the clutch, respectively, positive action over-center means for moving the pressure plate away from the back plate to engage the clutch, preloaded spring means arranged to be compressed between the pressure plate and over-center means in the engagement of the clutch for transmitting motion from the over-center means to the pressure plate toward engaging the clutch, said spring means having an inherent low rate within its operating range, and means for maintaining said spring means in pre-loaded condition.

4. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a single Belleville spring washer carried on the pressure plate by its one edge and in substantially concentric relation to the pressure plate, and positive-acting over-center means cooperating with said washer nearer its other edge to move the pressure plate away from the back plate and engage the clutch resiliently.

5. A clutch as set forth in claim 4 including means keeping the washer pre-loaded, said means permitting further loading of the washer in the engagement of the clutch so that the clutch is held engaged with increased spring pressure.

6. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a single Belleville spring washer carried on the pressure plate by its one edge and in substantially concentric relation to the pressure plate, a ring member engaging the other edge of said washer to limit axial expansion thereof away from the pressure plate, over-center means for transmitting movement through said ring to the washer to move the pressure plate away from the back plate so as to engage the clutch resiliently, and circumferentially extending cam means on the ring member providing a variable height abutment for the over-center means, said cam means and over-center means being relatively rotatably adjustable, whereby to take up for wear in the engaging clutch faces.

7. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of springs carried on the pressure plate in circumferentially spaced relation, a ring member holding all of said springs in caged relation to the pressure plate, positive acting over-center means for transmitting movement through said ring to the springs to move the pressure plate away from the back plate so as to engage the clutch resiliently, and circumferentially extending cam means on the ring member providing a variable height abutment for the over-center means, said cam means and over-center means being relatively rotatably adjustable, whereby to take up for wear in the engaging clutch faces.

8. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washers carried on the pressure plate in circumferentially spaced relation, a ring member holding the washers caged between it and the pressure plate preventing more than a like predetermined axial expansion of all the individual washers, and over-center means for transmitting movement through said ring to the washers to move the pressure plate away from the back plate so as to engage the clutch resiliently.

9. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washers carried on the pressure plate in circumferentially spaced relation, a ring member holding the washers caged between it and the pressure plate preventing more than a like predetermined axial expansion of all the individual washers, over-center means for transmitting movement through said ring to the washers to move the pressure plate away from the back plate so as to engage the clutch resiliently, and circumferentially extending cam means on the ring member providing a variable height abutment for the over-center means, said cam means and over-center means being relatively rotatably adjustable, whereby to take up for wear in the engaging clutch faces.

10. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washer assemblies carried on the pressure plate in circumferentially spaced relation, each assembly comprising at least two opposed washers with a spacer therebetween allowing free travel of the movable edges of said washers, a ring member holding the assemblies caged between it and the pressure plate preventing more than a like predetermined axial expansion of all the individual washers, and over-center means for transmitting movement through said ring to the washers to move the pressure plate away from the back plate so as to engage the clutch resiliently.

11. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a plurality of Belleville spring washer assemblies carried on the pressure plate in circumferentially spaced relation, each assembly comprising at least two opposed washers with a spacer therebetween allowing free travel of the movable edges of said washers, a ring member holding the assemblies caged between it and the pressure plate preventing more than a like predetermined axial expansion of all the individual washers, over-center means for transmitting movement through said ring to the washers to move the pressure plate away from the back plate so as to engage the clutch resiliently, and circumferentially extending cam means on the ring member providing a variable height abutment for the over-center means, said cam means and over-center means being relatively rotatably adjustable, whereby to take up for wear in the engaging clutch faces.

12. A friction clutch as set forth in claim 10, wherein the spacer in each of said washer assemblies is a ring of slightly smaller diameter than the associated washers, the latter having their outer peripheral edges flanged to engage the spacer ring peripherally, whereby to retain and center the same in assembled concentric relation to the washers.

13. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, bell-crank levers rotatably adjustable with the ring relative to the back plate and mounted for pivotal movement between the back plate and pressure plate to force the latter away from the back plate to engage the clutch, a channel section ring carried on said pressure plate in concentric relation to the first ring, helical cam means in the channel of said ring, and a fulcrum block slidably engageable with the helical surface of said cam means for rotary adjustment with an associated lever and having the latter fulcrumed thereon.

14. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, bell-crank levers rotatably adjustable with the ring relative to the back plate and mounted for pivotal movement between the back plate and pressure plate to force the latter away from the back plate to engage the clutch, a channel section ring carried on said pressure plate in concentric relation to the first ring, a plurality of arcuate cams inserted in the channel of said ring and projecting therefrom to provide a plurality of helical cam surfaces, one for each of said levers, and fulcrum blocks slidably engaged on and straddling the projecting portion of said cams and having the associated levers fulcrumed thereon.

15. A Belleville spring washer assembly comprising in combination, two opposed Belleville spring washers, and a spacer ring therebetween of slightly smaller diameter than said washers, the peripheral edges of said washers being flanged to engage the ring peripherally, whereby to retain the same in assembled concentric relation to the washers.

16. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, over-center means for engaging the clutch comprising bell-crank levers rotatably adjustable with the ring relative to the back plate and mounted for pivotal movement over center between the back plate and pressure plate to force the latter away from the back plate to engage the clutch and hold it engaged, a circularly flanged ring in concentric relation to the first ring and mounted on said pressure plate for axial movement with respect thereto, a channel section ring carried on the flanged ring and located in concentric relation therewith by the flange thereof, helical cam means in the channel of said ring, fulcrum blocks slidably engaging the helical surfaces of said cam means for rotary adjustment relative thereto with the bell-crank levers and having the latter fulcrumed thereon, and resilient means arranged to be compressed between the pressure plate and the circularly flanged ring in the engagement of the clutch.

17. A friction clutch as set forth in claim 16, including means cooperating with the circularly flanged ring for preloading the resilient means.

18. A friction clutch as set forth in claim 16, including means cooperating with the circularly flanged ring for preloading the resilient means, said resilient means being of a type having an inherent low rate within its operating range.

19. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, bell-crank levers rotatably adjustable with the ring relative to the back plate and mounted for pivotal movement between the back plate and pressure plate to force the latter away from the back plate to engage the clutch, said pressure plate having a channel-shaped recess provided thereon, helical cam means in said recess, and a fulcrum block slidably engageable with the helical surface of said cam means for rotary adjustment with an associated lever and having the latter fulcrumed thereon.

20. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring mounted for rotary adjustment relative to the back plate, bell-crank levers rotatably adjustable with the ring relative to the back plate and mounted for pivotal movement between the back plate and pressure plate to force the latter away from the back plate to engage the clutch, said pressure plate having a channel-shaped recess provided thereon, a plurality of arcuate cams inserted in said recess and projecting therefrom to provide a plurality of helical cam surfaces, one for each of said levers, and fulcrum blocks slidably engaged on and straddling the projecting portion of said cams and having the associated levers fulcrumed thereon.

21. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a single Belleville spring washer carried on the pressure plate by its one edge and in substantially concentric relation to the pressure plate, a ring member engaging the other edge of said washer to limit axial expansion thereof away from the pressure plate, and over-center lever means fulcrumed relative to the ring member and arranged to cooperate with the back plate to transmit movement through the spring washer to move the pressure plate away from the back plate to engage the clutch resiliently.

22. In a friction clutch, the combination with a flywheel constituting the driving element, and a clutch disc constituting the driven element and having facings thereon, of a back plate in fixed axially spaced relation to the flywheel, a pressure plate turning with the back plate and movable toward and away from the same in the disengagement and engagement of the clutch, respectively, yieldable resilient means of a type having an inherent low rate within its operating range arranged to be compressed against the back of the pressure plate in the engagement of the clutch to grip the clutch disc resiliently between the pressure plate and flywheel, a ring member to limit expansion of said resilient means away from the pressure plate, and over-center lever means fulcrumed relative to the ring member and arranged to cooperate with the back plate to transmit movement through the resilient means to move the pressure plate away from the back plate to engage the clutch resiliently.

23. In a friction clutch, the combination with a flywheel constituting the driving element, and a clutch disc constituting the driven element and having facings thereon, of a back plate in fixed axially spaced relation to the flywheel, a pressure plate turning with the back plate and movable toward and away from the same in the disengagement and engagement of the clutch, respectively, spring means arranged to be compressed against the back of the pressure plate in the engagement of the clutch to grip the clutch disc resiliently between the pressure plate and flywheel, a ring member to limit expansion of said spring means away from the pressure plate, and over-center lever means fulcrumed relative to the ring member and arranged to cooperate with the back plate to transmit movement through the spring means to move the pressure plate away from the back plate to engage the clutch resiliently.

24. In a clutch, the combination of a pair of frictionally engageable driving and driven clutch members, a pressure plate member connected to turn with one of said clutch members and shiftable to cause driving engagement of said clutch members, and means for moving the pressure plate member to engaging position comprising a resilient element and an over-center clutch actuating lever interposed between the pressure plate member and one of the clutch members, the resilient element abutting one of the two last-named members in the direction of flexure, and said lever having means for mounting the same for pivotal movement relative to said resilient element and having a portion for engaging the other of the two last-named members, the rocking of said lever relative to said resilient element as a fulcrum moving the pressure plate member to driving position, and the resilient element cooperating with the lever so as to be flexed in the engagement of the clutch to hold the clutch members resiliently engaged.

25. Actuating mechanism for a pair of clutch elements forming the gripping portions of an over-center clutch comprising a resilient member abutting one of the elements in the direction of flexure, and over-center lever means supported for pivotal movement relative to said resilient member and having a portion for engagement with the other clutch element so as to clamp the elements together resiliently when said lever means is moved over center, said resilient member being flexed in the movement of said lever means over center.

26. In a friction clutch, the combination with a flywheel constituting the driving element, and a clutch disc constituting the driven element, of a back plate for the flywheel, a pressure plate turning with the back plate and movable toward and away from the same in the disengagement and engagement of the clutch, respectively, a ring member in concentric relation to said plates and guided for a limited axial movement with respect to one of said plates so as to hold springs in caged relation thereto in preloaded condition, a plurality of springs in circumferentially spaced relation to said ring and plate and compressed therebetween, circumferentially extending cam means in concentric relation with said ring member and turning with the pressure plate, and positive acting over-center means between the pressure plate and back plate engaging said cam means to move the pressure plate away from the back plate and further compress the aforesaid springs so as to engage the clutch resiliently under increased spring pressure, said cam means and over-center means being relatively rotatably adjustable to take up for wear in the engaging clutch faces.

KAY MILLER.
W. VINCENT THELANDER.